April 22, 1958 T. J. KEARNEY 2,831,454
HYDRAULIC LIFT AND TRANSFER MACHINE
Filed Feb. 2, 1955 11 Sheets-Sheet 8
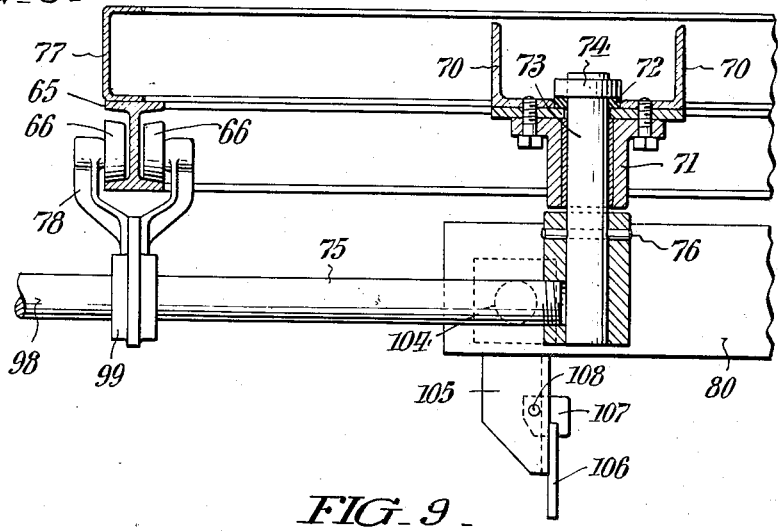
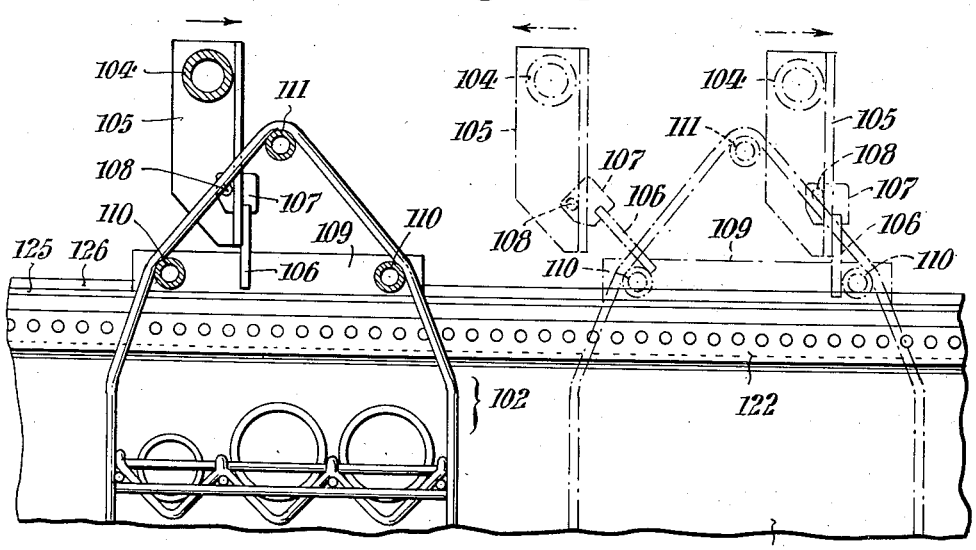
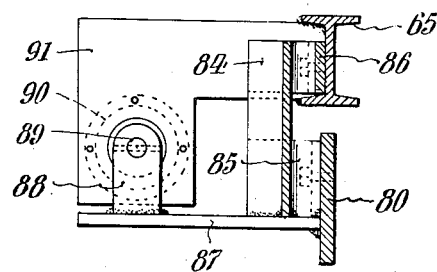
INVENTOR.
Thomas J. Kearney,
BY
Paul & Paul
ATTORNEYS.

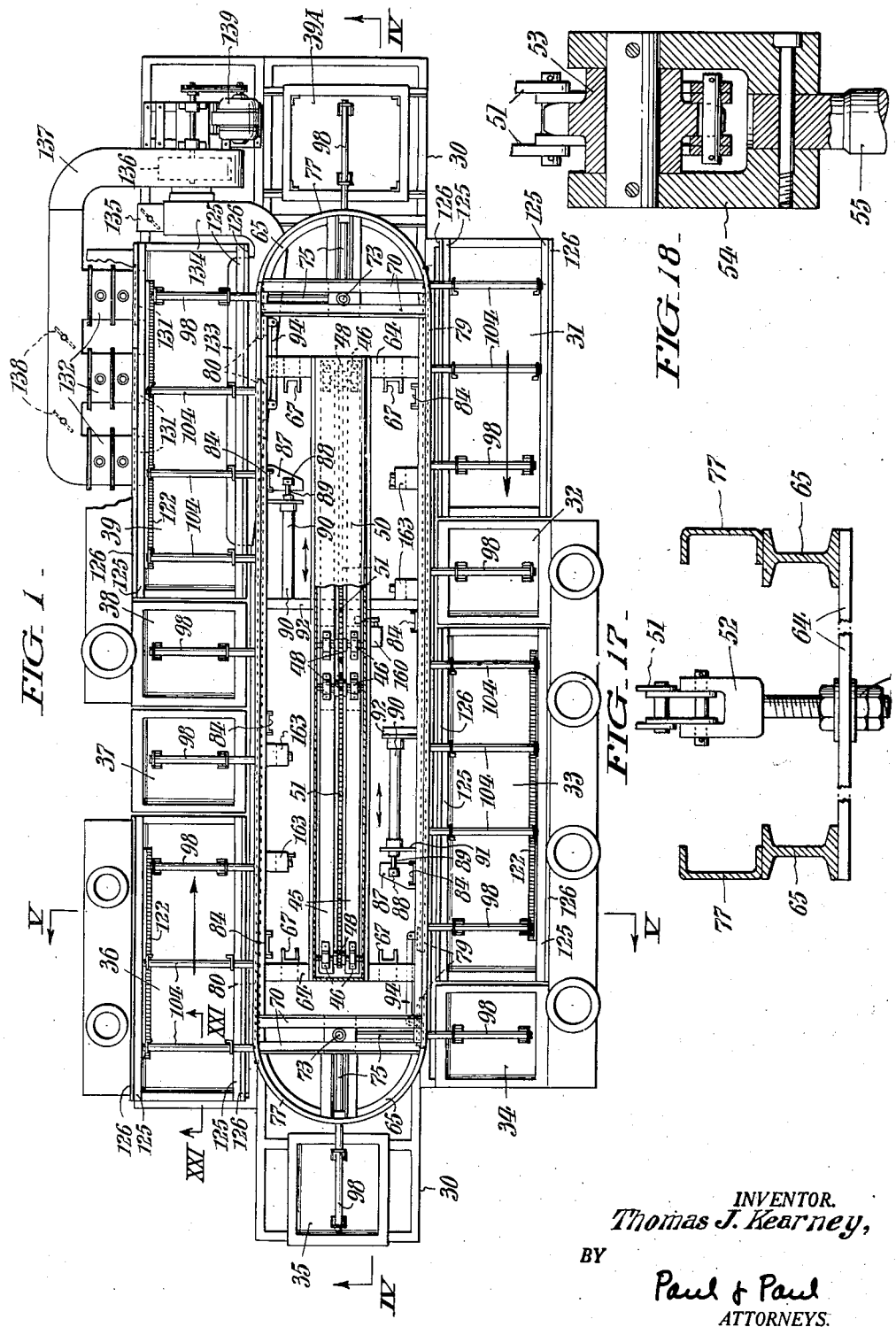

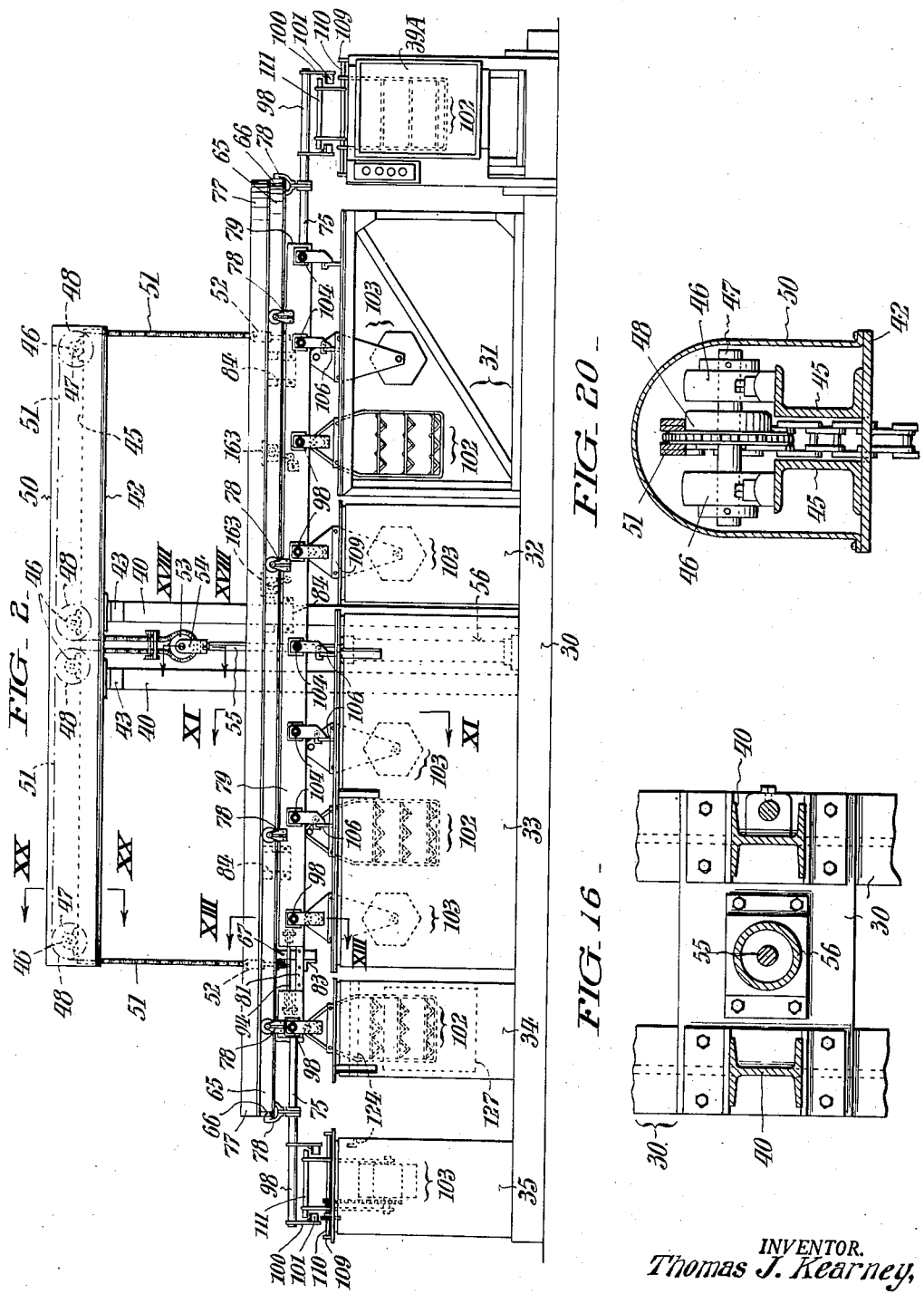

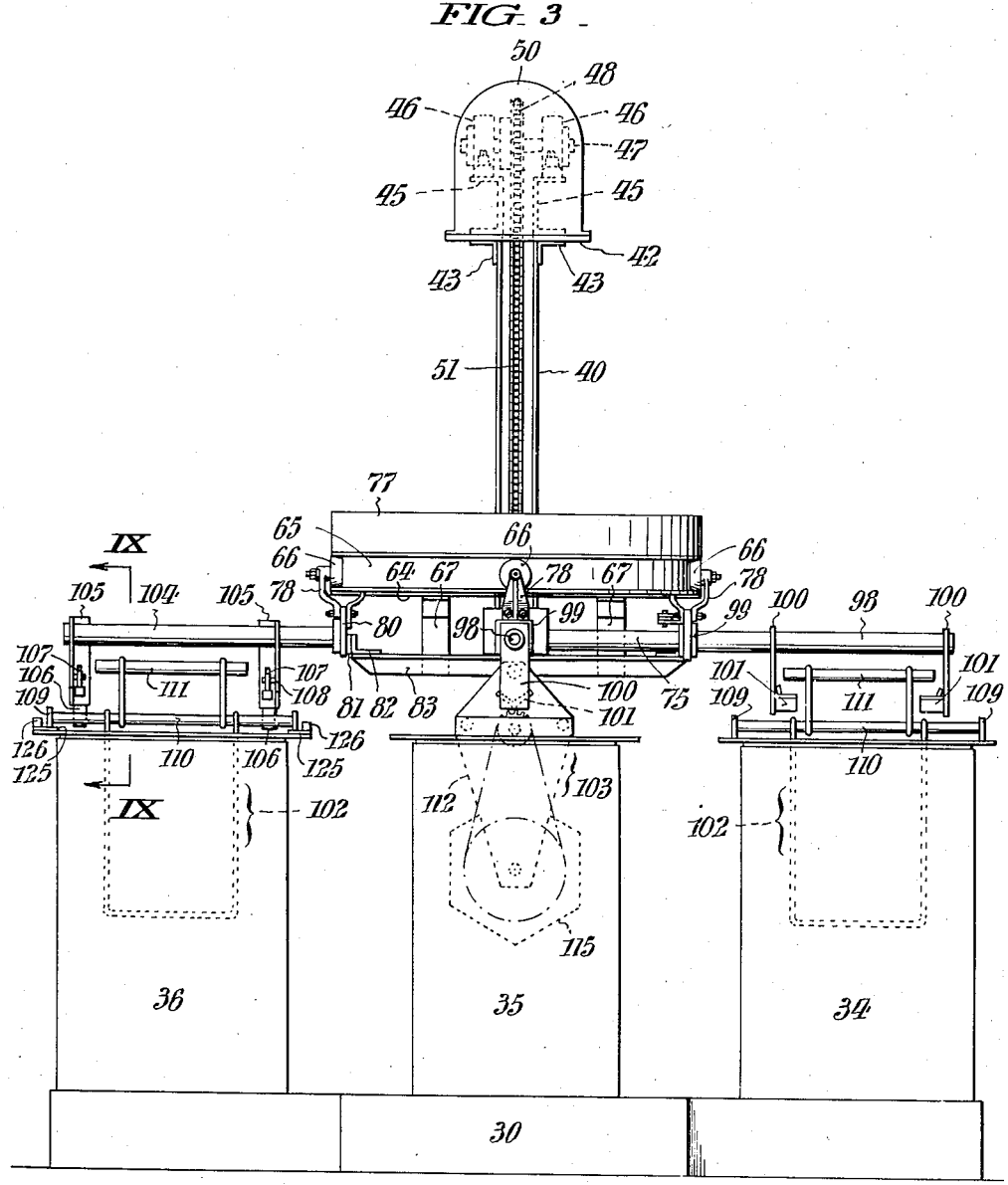

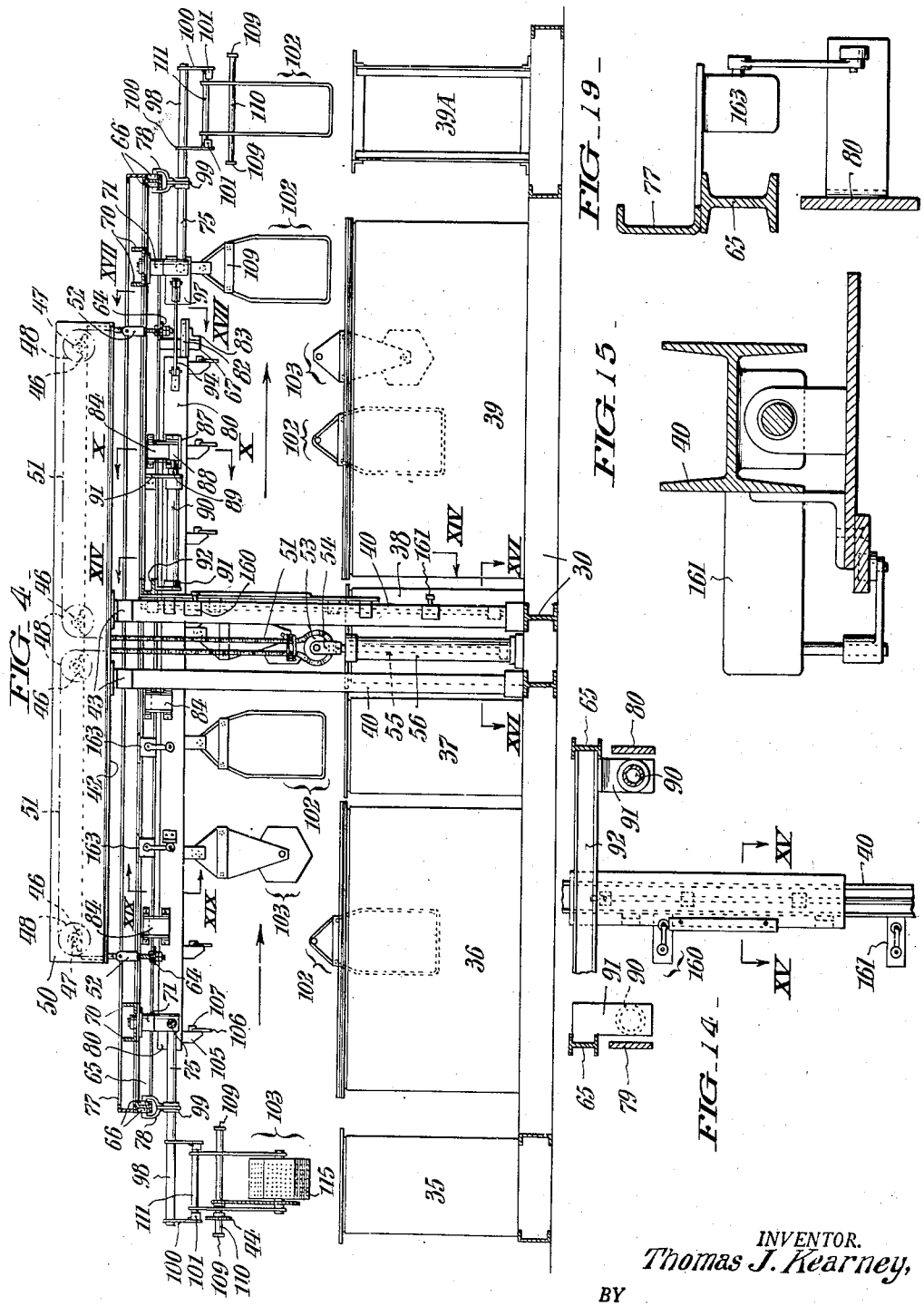

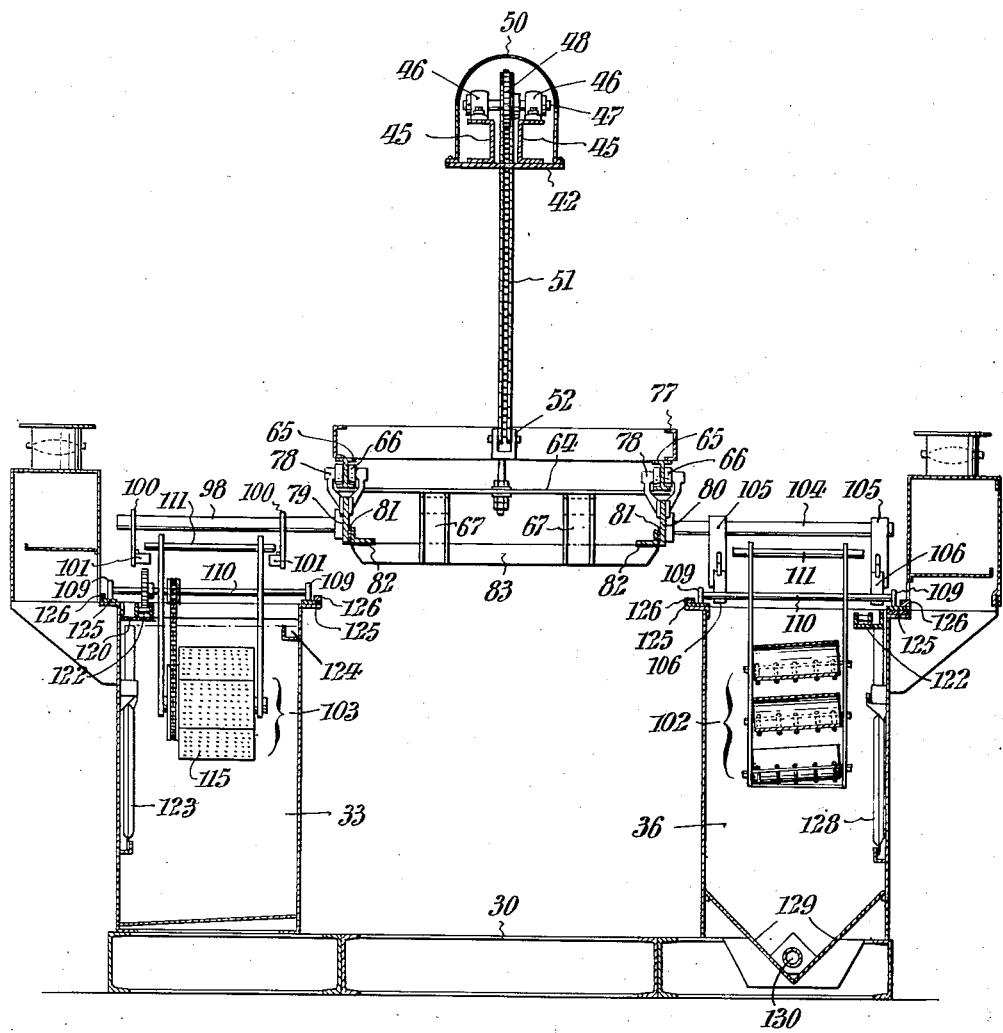

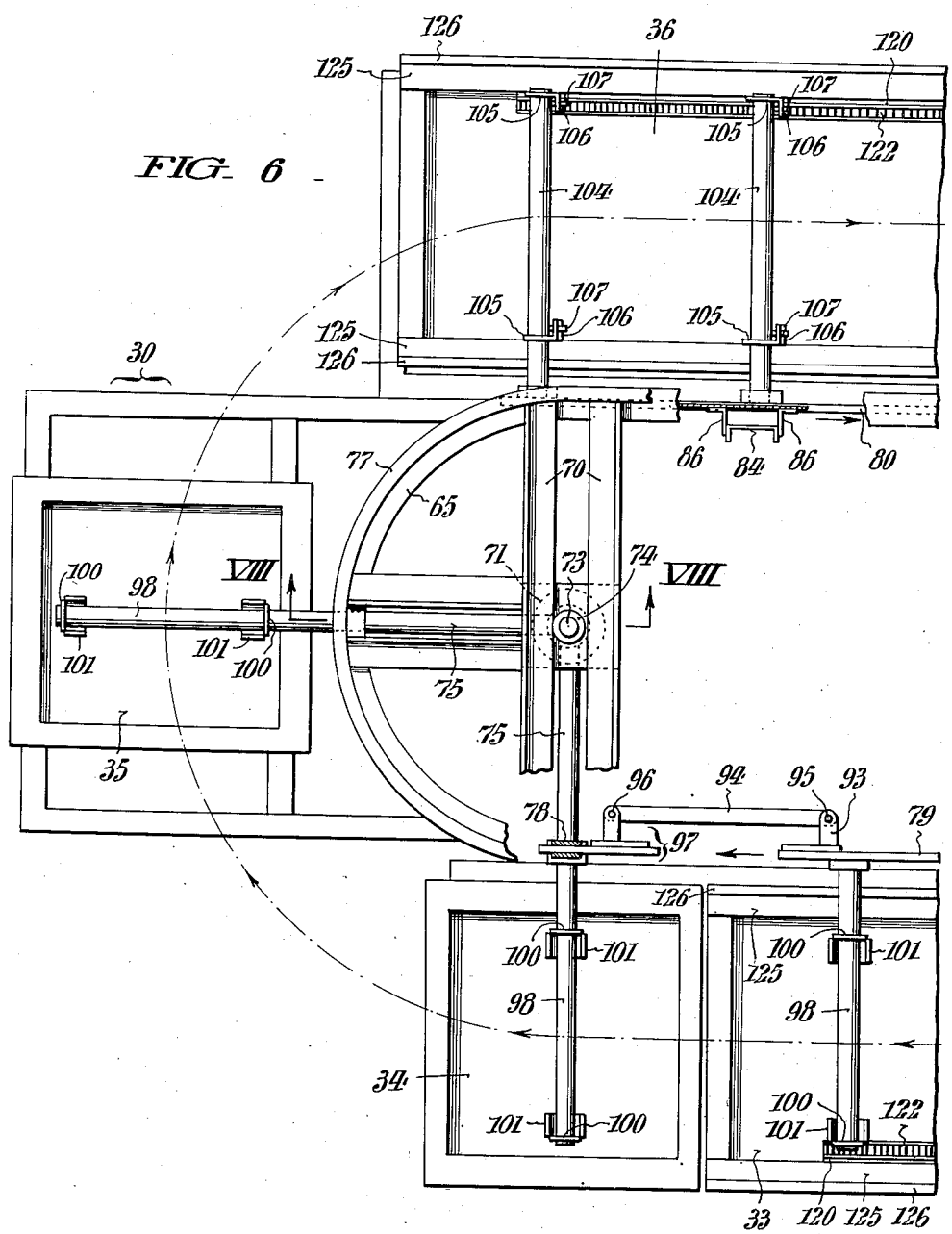

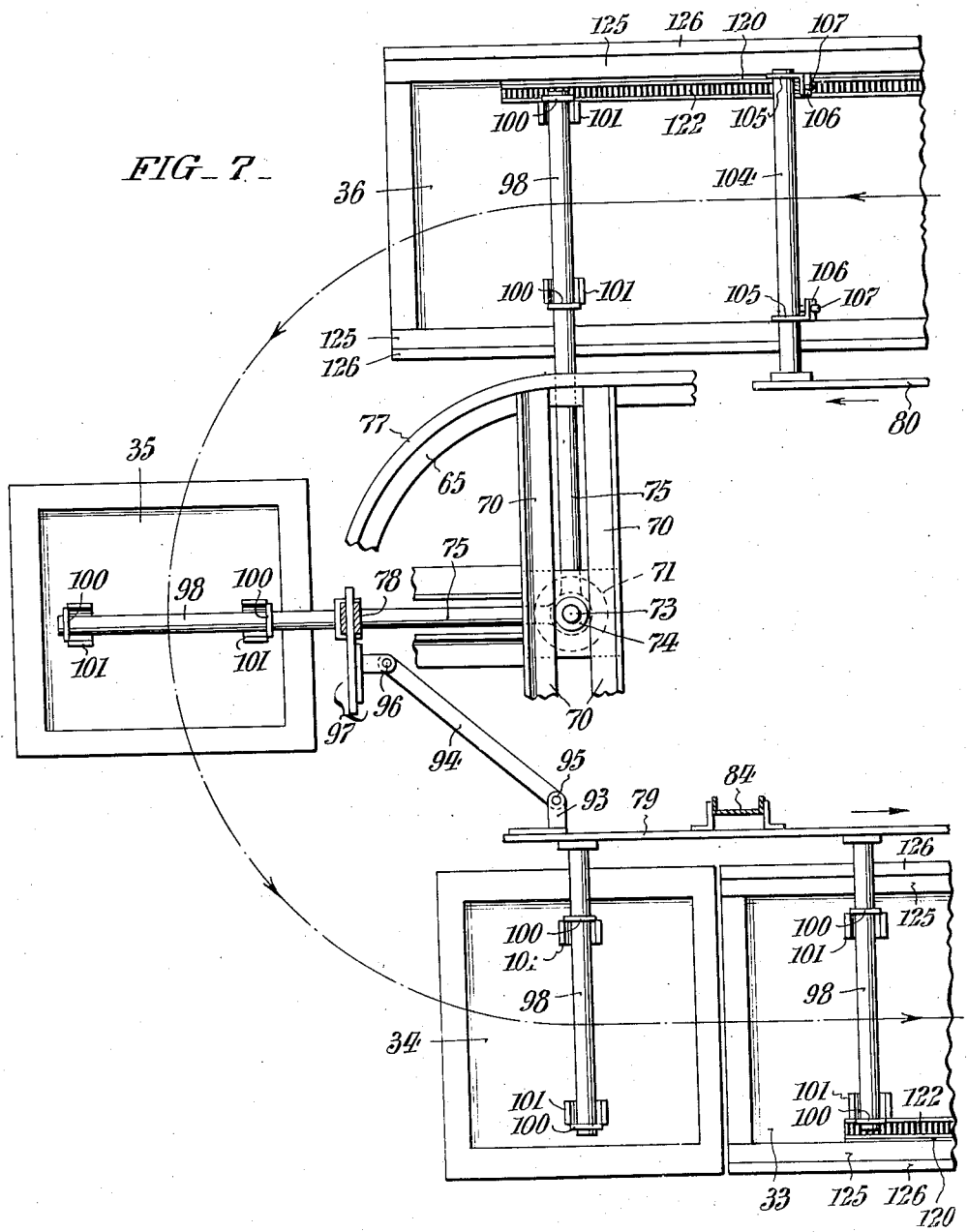
FIG_7_

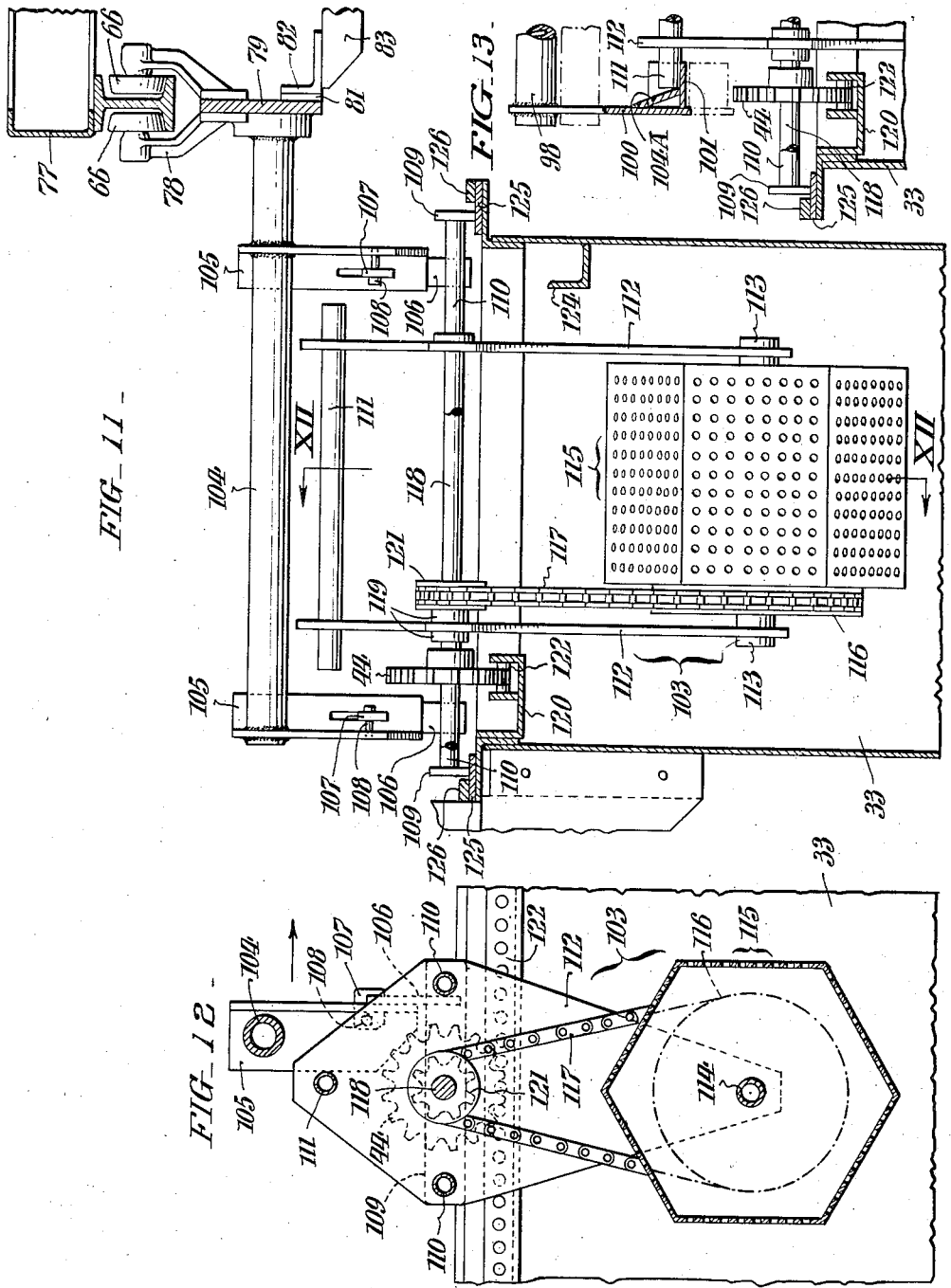

April 22, 1958     T. J. KEARNEY     2,831,454
HYDRAULIC LIFT AND TRANSFER MACHINE
Filed Feb. 2, 1955     11 Sheets-Sheet 10
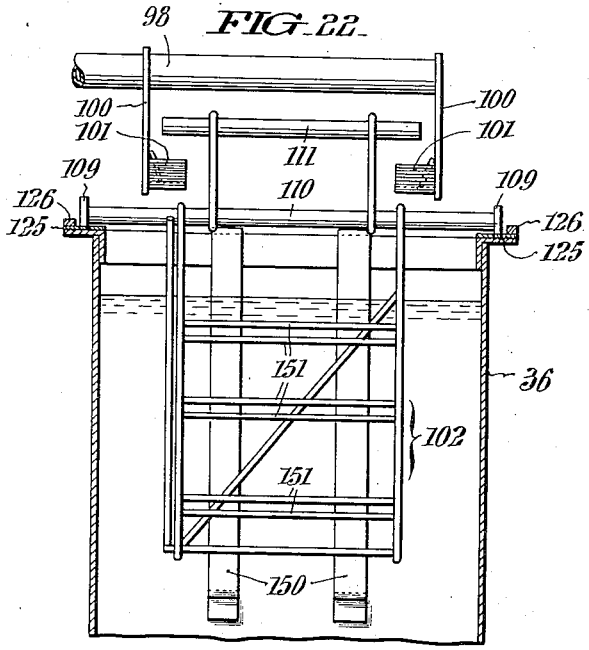
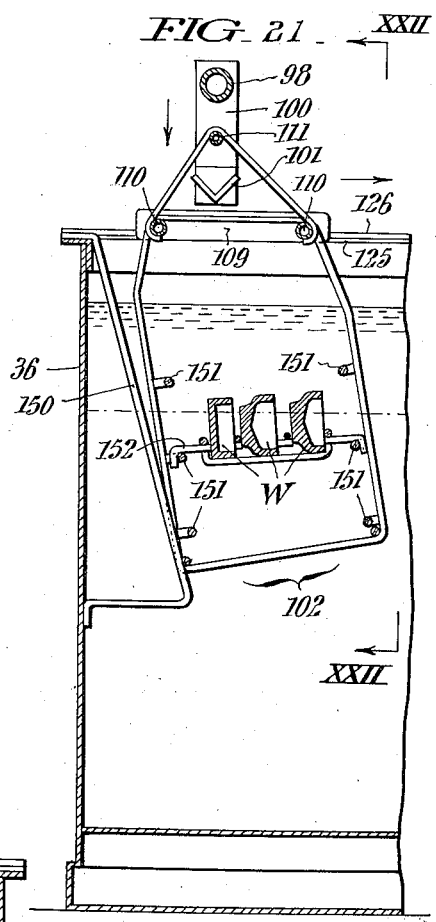
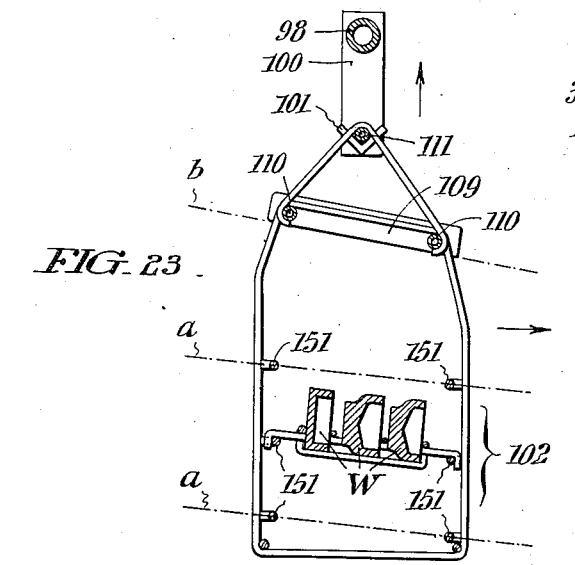
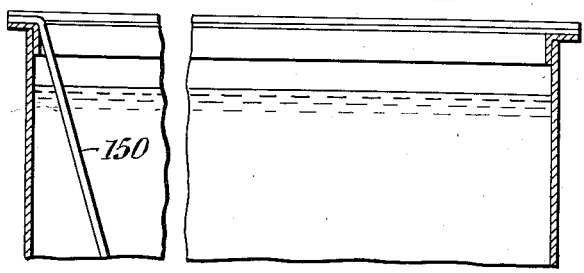
INVENTOR.
Thomas J. Kearney,
BY
Paul & Paul
ATTORNEYS.

April 22, 1958  T. J. KEARNEY  2,831,454
HYDRAULIC LIFT AND TRANSFER MACHINE
Filed Feb. 2, 1955  11 Sheets-Sheet 11
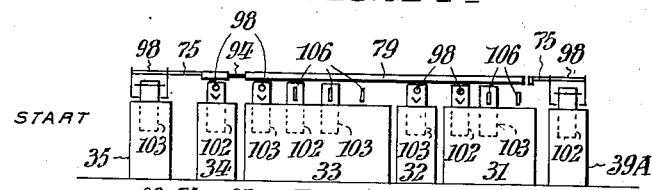
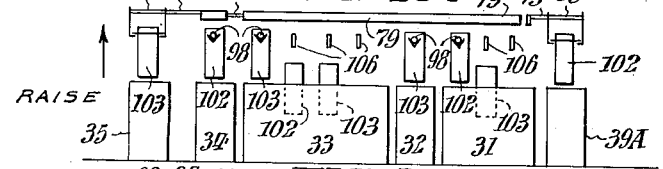
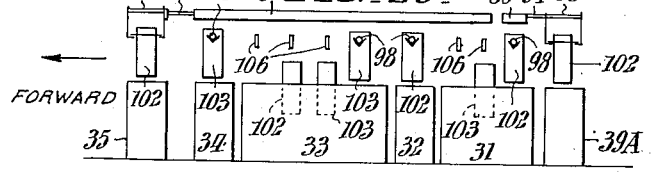
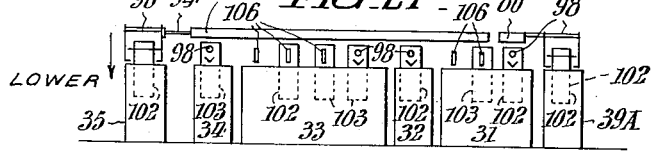
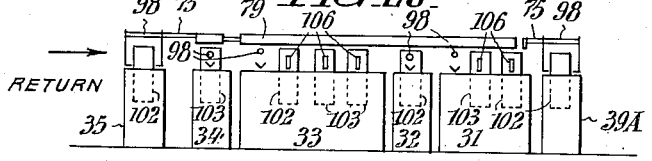
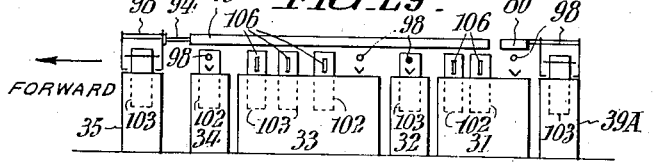
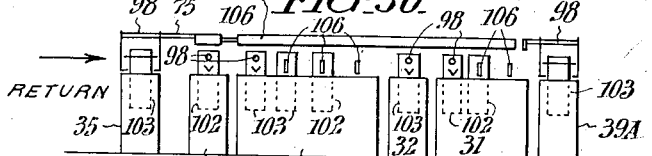
INVENTOR.
Thomas J. Kearney,
BY
Paul & Paul
ATTORNEYS.

United States Patent Office 2,831,454
Patented Apr. 22, 1958

2,831,454

HYDRAULIC LIFT AND TRANSFER MACHINE

Thomas J. Kearney, Detroit, Mich., assignor to Detrex Chemical Industries, Inc., a corporation of Michigan Application February 2, 1955, Serial No. 485,659

19 Claims. (Cl. 118—423)

This invention relates to a method of processing metal parts, and further concerns apparatus and method for subjecting work objects to successive treatments at a plurality of spaced-apart work stations. More specifically, the invention concerns the phosphate coating of metals, and further concerns apparatus for applying the coating.

It is conventional to coat metal parts with phosphate to retard surface corrosion, to furnish a surface which forms a bond for subsequent finishing, or to provide a protective coating in the case of metal drawing which prevents cracks from occurring as the metal is deformed. Phosphate coatings are usually applied to ferrous metal by immersing the metal in a liquid bath containing phosphate coating chemicals. It is commercially desirable to clean the metal prior to the coating process and to subject the coated metal to subsequent treating and rinsing operations.

Hereofore, when processing metal parts through a phosphate coating process, it has been customary to rack some of the work objects, which do not require rotation, in one system while parts requiring rotation have been processed in tumbling barrels in another system. It is an object of the present invention to process all the work objects in a single system.

Conventional lift and transfer mechanisms have been heretofore placed over the various process tanks of a phosphate coating system. This arrangement has the disadvantage that lubricated surfaces can drip into the tanks containing treating solutions causing contamination of the solutions. It is another object of this invention to provide an apparatus for subjecting work objects to successive treatments in process tanks, wherein no lubricated parts are located directly over any of the process tanks, and therefore no contamination from the lubricant can occur.

It is still another object of this invention to provide a novel apparatus of improved efficiency for processing metals through a series of successive liquid baths. Another object is to provide such an apparatus, wherein the work movement in one or more baths is independent of the work movement in one or more other baths. Another object is to provide a novel apparatus for treating work objects in solutions of various types. Other objects and advantages of the invention will further become apparent hereinafter, and in the drawings, whereof:

Fig. 1 is a plan view of a phosphate coating machine comprising one specific form of the invention;

Fig. 2 is a front view of the processing machine shown in Fig. 1, with the lift lowered and fixtures lowered, and with certain parts removed in order more particularly to illustrate important details;

Fig. 3 is an end view of the processing machine as viewed from the left of Figs. 1 and 2, with the lift and fixtures lowered;

Fig. 4 is a view in longitudinal cross section of the processing machine, with the lift and fixture raised, taken as indicated by the lines and arrows IV—IV which appear in Fig. 1;

Fig. 5 is a view in section taken as indicated by the lines and arrows V—V which appear in Fig. 1;

Fig. 6 is an enlarged partial plan view of the lift end of the machine shown in Fig. 1;

Fig. 7 is a partial plan view similar to Fig. 6, certain parts being shown in different positions;

Fig. 8 is a sectional view taken as indicated by the lines and arrows VIII—VIII which appear in Fig. 6;

Figs. 9 and 10 are sectional views taken as indicated by the lines and arrows IX—IX and X—X which appear in Figs. 3 and 4, respectively;

Fig. 11 represents a sectional view taken as indicated by the lines and arrows XI—XI which appear in Fig. 2;

Fig. 12 represents a sectional view taken as indicated by the lines and arrows XII—XII which appear in Fig. 11;

Fig. 13 represents a sectional view taken as indicated by the lines and arrows XIII—XIII which appear in Fig. 2;

Fig. 14 represents a sectional view taken as indicated by the lines and arrows XIV—XIV which appear in Fig. 4;

Fig. 15 represents a sectional view taken as indicated by the lines and arrows XV—XV which appear in Fig. 14;

Figs. 16 and 17 represent sectional views taken as indicated by the lines and arrows XVI—XVI and XVII—XVII respectively which appear in Fig. 4;

Fig. 18 represents a sectional view taken as indicated by the lines and arrows XVIII—XVIII which appear in Fig. 2;

Fig. 19 represents a sectional view taken as indicated by the lines and arrows XIX—XIX which appear in Fig. 4;

Fig. 20 represents a sectional view taken as indicated by the lines and arrows XX—XX which appear in Fig. 2;

Fig. 21 represents a sectional view taken as indicated by the lines and arrows XXI—XXI which appear in Fig. 1 showing a modified form of apparatus wherein a work-carrying fixture is tilted as it enters the treating solution;

Fig. 22 represents a sectional view taken as indicated by the lines and arrows XXII—XXII which appear in Fig. 21;

Fig. 23 represents a view similar to Fig. 21 showing the fixture lifted out of the solution; and Figs. 24–30 represent diagrammatic side views corresponding to Fig. 2 showing the successive stages of the operation of the apparatus.

Turning now to the specific embodiment of the invention illustrated in the drawings, a suitable structural base 30 is provided to support a load and unload station frame 31, pre-dip tank 32, alkali wash tank 33 and hot water rinse tank 34 on the load and unload side of the processing machine. Another water rinse tank 35 is mounted at the left end of the structural base 30, as viewed in Figs. 1 and 2, for example. On the side opposite the load and unload station frame 31, the structural base 30 also carries a phosphate coat tank 36, a third water rinse tank 37, a chromic acid dip tank 38 and a drying tank 39. A cooling frame 39A is mounted on the right hand end of the structural base 30 as the machine is viewed from the load and unload side.

Mounted on the structural base 30 centrally between the rows of tanks and adjacent the middle of the processing machine are beams or columns 40. The columns 40 are fastened to a support plate 42 by angles 43. The support plate 42 is welded to channels 45 on which are mounted anti-friction pillow blocks 46 (see Fig. 20). The pillow blocks 46 carry sprocket shafts 47 on which are mounted keyed sprockets 48. The support plate 42 is bolted to an upper cover 50.

The sprockets 48 carry a roller chain 51 both ends of which extend downwardly and are fixed to the adjustable clevises 52. From the central sprockets 48 the roller chain 51 extends downwardly between the columns 40 and passes under an elevatable sprocket 53. The sprocket 53 is carried by a clevis 54 (see also Fig. 18) which is fixed on the end of a piston rod 55 of a cylinder 56 which is bolted to the structural base 30.

The adjustable clevis 52 is fixed to a cross plate 64 of an endless generally oval shaped I-beam track 65 (see also Fig. 17), which has semi-circular ends. Near each end, the I-beam track 65 is provided with angle cross members 70 to which are bolted flanged bearings 71 (see also Figs. 6-8) the centers of which are co-incident to the centers of the radii of the semi-circular ends of the continuous I-beam track 65. The flanged bearings 71 are provided with thrust rings 72 adjacent their upper faces and carry rotatable shafts 73. Affixed to the upper ends of the shafts 73 are set collars 74 the lower faces of which bear against the upper face of the thrust rings 72. The lower extension of the shafts 73 carries two-arm pitmans 75 which are affixed thereto by pin 76. Mounted on the upper surface of the continuous I-beam rail 65 is a cover guard 77.

In rolling contact with the upper surface of the lower flange of the I-beam rail 65 are trolley rollers 66 having dependent hanger brackets 78. The hanger brackets 78 are attached to a pusher bar 79 on the load and unload side of the machine; on the opposite side of the machine they are attached to another pusher bar 80. The pusher bars 79 and 80 are in sliding contact with intermittent wearing strips 81 which are bolted to the angles 82 (see Fig. 5). The angles 82 are bolted to cross angles 83 which are bolted to cross plates 64 by channels 67 at each end of the machine. Also bolted to the pusher bars 79 and 80 are upwardly reaching guide brackets 84 and connecting guide brackets 85 (see also Fig. 10). The upper ends of the guide brackets 84 are provided with wearing strips 86 which are in sliding contact with the inner face of the web of the continuous I-beam rail 65. The upper reaching guide brackets 84 and connecting guide brackets 85, which are mounted at the trailing end of the pusher bars 79 and 80, taken with respect to the direction of work travel as indicated by the direction arrows in Fig. 1, are provided with connection plates 87 to which are bolted piston attachment blocks 88 (see Figs. 1 and 10). The piston attachment blocks 88 are attached by threaded engagement with the piston rods 89 of the hydraulic operated horizontal pushing cylinders 90. The horizontal pushing cylinders 90 are bolted to channel members 91 which are attached to the center cross members 92, of the continuous I-beam rail 65 (see Figs. 4 and 10). Also bolted to the extreme after end of the pusher bars 79 and 80 are clevis connectors 93 in which are mounted connecting links 94 on link pins 95 (see Figs. 6 and 7). The opposite ends of the connecting links 94 are connected through pins 96 to pitman blocks 97. The pitman blocks 97 are fixed to the arm pitmans 75 and also to hanger brackets 78 which as mentioned above are supported in rolling contact with the continuous I-beam rail 65.

Work lifting arms 98 which extend outward over the load and unload station 31, pre-dip tank 32, alkali wash tank 33, on the load and unload side of the machine are bolted to the pusher bar 79 while the work lifting arms 98 extending outward over the phosphate coating tank 36, hot water rinse 37 and chromic acid dip tank 38 are bolted to the pusher bar 80. The work lifting arm 98 over the hot water rinse tank 34 is bolted to pitman arm block 97 and the work lifting arm 98 over the drying tank 39 is bolted to pitman arm block 97 at the opposite end of the machine. The lifting arm 98 over the rinse tank 35 is bolted to block 99 (Fig. 8) which is attached to the second arm 75 of the pitman bracket at the left end of the machine and lifting arm 98 over the cooling station 39A is attached to block 99 which is attached to the second arm 75 of the pitman bracket at the right end of the machine. The lifting arms 98 are equipped with depending brackets 100 which terminate in V-shaped pockets 101 which are provided to pick up rigid work fixtures 102 or rotary work baskets 103 (see Figs. 2 and 6). Within the V-shaped pockets 101 are work fixture or work basket centering plates 104A (see Fig. 13). It will be apparent from the drawings that the lifting arms 98 are located above the centers of the work fixture positions in the single tanks 32, 34, 35, 37, 38 and the center of the work fixtures at the exit end position in the multiple position tanks 33, 36, 39.

To advance the work fixtures 102 or the rotary work baskets 103 from these exit positions or from tank to tank they are first elevated by the downward movement of the piston 55 of the hydraulic elevating cylinder 56, which acts through elevating chain 51 running under lower sprocket 53 and upper sprockets 48 to adjustable clevises 52 connected to the I-beam rail 65, as heretofore described. After thus elevating the work fixtures 102 and rotary baskets 103 (to the position illustrated in Fig. 4), they are moved horizontally by the hydraulically operated horizontal pushing cylinders 90 in the direction of work travel. This latter movement is caused by the movement of the cylinder piston rod 89 which is connected to attachment block 88, connection plate 87, and pusher bars 79 and 80. At the semi-circular ends of the machine the work fixtures 102 and rotary baskets 103 are moved horizontally through a 90 degree arc by the pitman arm brackets 75 which are connected to the pusher bars 79 and 80 by the connecting links 94. In this manner each work fixture lifted from rinse tank 34 is transferred to a position over rinse tank 35 and the work fixture raised from rinse tank 35 is moved to a location directly above the first work position in the phosphate coating tank 36. Likewise, at the right hand end of the machine, the work fixture raised from the drying tank 39 is moved over the cooling frame 39A and the work fixture raised from the cooling frame 39A is moved to the first position over the load and unload frame 31.

After advancing all of the work fixtures 102 and rotary baskets 103 horizontally while they are in the raised position, the elevating cylinder 56 is again operated in the opposite direction to lower them in this advanced position into their various tanks. Thus the work fixture in the most advanced position in the load and unload frame 31 is advanced into the pre-dip tank 32, from the pre-dip tank 32 to the first position in alkali wash tank 33, from the most advanced position in the alkali wash tank 33 to the rinse tank 34, from the rinse tank 34 to rinse tank 35, from rinse tank 35 to the first position in the phosphate coat tank 36, from the most advanced position in the phosphate coat tank 36 to the rinse tank 37, from the rinse tank 37 to the chromic acid tank 38, from the chromic acid tank 38 to the first position in the drying tank 39, from the most advanced position in the drying tank 39 to the cooling frame 39A and from the cooling frame 39A to the first position in the load and unload frame 31. At each tank, the V-shaped supports 101 are spaced below the ends of the corresponding tubular cross member 111, whereby they are free of the basket.

The pusher bars 79 and 80 are next returned to the starting position by the reverse action of the hydraulically operated pushing cylinders 90 and the work fixtures 102 and rotary baskets 103 remain in their tank position.

Above the alkali wash tank 33, the phosphate coating tank 36 and the drying tank 39, which are multi-work position tanks, and bolted to pusher bars 79 and 80 are pusher arms 104, see Figs. 9, 11 and 12. Fig. 9 shows the starting position of the horizontal movement of the work fixture 102; the right hand phantom view shows the advanced position of the work fixture 102 and the mid-position phantom view of the pusher arm 104 and pusher dog 106 shows them on their return stroke.

Dependent arms 105 fixed to the pusher arms 104 carry pusher dogs 106. The upper lugs 107 of the pusher dogs 106 are fitted through slots in the dependent arms 105 and the pins 108 act as a pivot for the pusher dogs 106. Thus it will be seen, as shown in Fig. 9, that as the pusher arms 104 are moved in the direction of travel the pusher dogs 106 are in a vertical position and will push the work fixtures 102 or rotary baskets 103, but when the pusher arms 104 are moved in the reverse direction the pusher dogs 106 will pivot on pins 108 and slide over the work fixtures 102 or the rotary baskets 103.

The hydraulically operated pushing cylinders 90 move the pusher bars 79 and 80 in the direction of work travel. The pusher arms 104 through pusher dogs 106 advance the work fixtures 102 and rotary baskets 103 to the next position in the alkali wash tank 33, the phosphate coating tank 36 and the drying tank 39. The hydraulic cylinders 90 then return to the starting position and after a predetermined timed period, these cycles are repeated. The work fixtures 102 are provided with slide bars 109 the bottom edges of which form a rest when the work fixtures 102 are placed within the various tanks. The tubular cross ties 110 of the fixtures 102 are welded to slide bars 109 and serve as spacers and supports for the dependent rod typework supports (Figs. 2 and 5). The upper tubular cross member 111 also acts as a cross tie and its projecting ends are picked up by the V-shaped pockets 101 on brackets 100 of the lifting arms 98 for travel around the semicircular ends of the track 65. The bottom edge of the slide bar 109 also acts as the sliding friction surface as the work fixtures 102 are pushed from position to position in the load and unload frame 31, the alkali wash tank 33, the phosphate coating tank 36 and the drying tank 39.

The rotary baskets 103 are also provided with slide bars 109 which serve in a similar manner as described for the work fixture 102 above. The rotary baskets 103 are also provided with an upper tubular cross member 111 that functions in a similar manner as described for the work fixture 102. Each rotary basket 103 is provided with a pair of pendent plate hangers 112 (Figs. 11 and 12) the lower ends of which hold bearings 113 for the shaft 114 of the perforate basket body 115. Also mounted on the shaft 114 between perforate basket body 115 and on plate hanger 112 is a log chain sprocket 116. A log chain 117 trained over the log sprocket 116 also meshes with log sprocket 121 on a drive shaft 118. The drive shaft 118 is supported by bearings 119 in the plate hangers 112. One end of the drive shaft 118 projects beyond the plate hanger 112 and carries a rotating sprocket 44 which is keyed thereto. As the rotating basket 103 is placed in a multi-position tank or station, the sprocket 44 meshes with a pin rack 122 which is supported on a channel 120 welded within each tank or station. As the pusher bars 79 and 80 move forward in the direction of travel the push dogs 106 bearing against the tubular cross member 110 move the entire rotary fixture 103 to advance it to the next position. Thus the sprocket 44 in mesh with the pin rack 122 is rotated and thereby drives log chain sprocket 121. The log chain 117 drives the perforate basket 115 through log chain 117 and log chain sprocket 116 on shaft 114.

The upper flanges of the load and unload station are also covered with brass wearing strips 125 over which are mounted retainer strips 126 (see Figs. 1, 5, and 11).

The alkali wash tank 33 is equipped with a steam heating plate coil 123 (Fig. 5) provided with inlet and outlet connections. The alkali wash tank 33 is also provided with water inlet and an overflow trough 124 from which the overflow is piped to drain. The side flanges of the alkali wash tank 33 are covered with brass wearing strips 125 on which slide bars 109 of the work fixtures 102 and rotary baskets 103 slide. Retainer strips 126 are mounted on the wearing strips 125 to prevent misalignment of the work fixtures 102 and rotary baskets 103.

The hot rinse tank 34 is also equipped with a steam heating plate coil 127 (see Fig. 2) provided with inlet and outlet connections. An overflow trough 124 with outlet connection to drain is provided in hot rinse tank 34. The water rinse tanks 35 and 37 also have overflow troughs with outlet connections to drain.

The phosphate coating tank 36 is equipped with steam heating plate coil 128 provided with suitable inlet and outlet connections, (see Fig. 5). The bottom of the phosphate coating tank 36 is V-shaped as shown at 129 and a perforated drain pipe 130 is placed near the bottom to syphon out any accumulated sludge. A temperature control unit not shown, is provided in the steam inlet piping to the phosphate coat tank 36 to maintain the desired solution temperature.

The chromic acid dip tank 38 is provided with a steam heating plate coil, not shown. The drying tank 39 has openings 131, see Fig. 1, which are connected to a fin and tube type air heater 132 on one side. The opposite side of the drying tank 39 has an opening 133 which is connected to fan suction duct 134. The fan suction duct 134 is provided with a dampered fresh air inlet 135 and is connected to the suction fan 136. The exhaust side of the suction fan 136 is connected by the exhaust duct 137 to the air heaters 132 with dampered connections 138. The suction fan 136 is driven through belted sheaves by the electric motor 139.

Turning to Figs. 21–23, the slide bars 109 of work fixture 102 are inclined at an angle to the horizontal and vertical axes of the fixture, and the wall of tank 36 (and other tanks, if desired) carries fixed, inclined plates 150. Inclined plates 150 contact the trailing corner of the fixture 102 when said fixture is lowered into the tank, thereby inclining the fixture as illustrated in Fig. 21. It will further be noted that the corresponding pairs of work-supporting rods 151 are arranged along parallel inclined planes indicated by the dot-dash lines a, which have less inclination to the horizontal than the inclination b of the bottom surfaces of slide bars 109. Accordingly, when the fixture is immersed in the phosphate coating tank 36, as shown in Fig. 21, a work carrier 152 supported by the rods 151 is inclined upwardly. Although the angle of upward inclination may be varied within wide limits, an angle of five degrees is sufficient. This is advantageous, since gases are produced at the surfaces of the work objects W as a result of the action of acid phosphates on the metal, and the inclination permits the gases to escape from tubular or closed-end objects. When the fixture is lifted out of the phosphate coating bath, the work objects are inclined downwardly as illustrated in Fig. 23, permitting the residual phosphate coating solution to drain from the metal. Although the angle of downward inclination may be varied within wide limits, an angle of 15 degrees is sufficient. The work supports may also be inclined laterally, as shown in Fig. 5. The arrangements just described, particularly those of Figs. 21–23, have advantage in connection with other baths as well as phosphate coating baths, since air entrapment is avoided and good drainage assured.

It will be appreciated that the operation of the machine is preferably automatic or semi-automatic. The mechanical movements are preferably controlled by limit switches which are connected in circuit with solenoid valves and with timers, etc., to provide proper operation.

Turning to Figs. 24–30 of the drawings, it will be appreciated that Fig. 24 shows the starting position of the machine, as in Figs. 1 and 2. A solenoid is energized to raise the elevator mechanism, as shown in Fig. 4, and when the elevator reaches the top a limit switch 160 (Fig. 14) closes a relay resetting the timer and counter and completing a circuit to a solenoid starting transfer movement as illustrated in Fig. 26, wherein the baskets or fixtures are moved from a location above one tank to a location above the next tank. At the end of the transfer stroke, as controlled by limit switches 163 (Figs.

4, 19) the elevator is automatically lowered and stopped by a limit switch 161 (Figs. 14, 15). The transfer mechanism is then returned, as illustrated in Fig. 28. At the end of the return, forward transfer is started in the elongated or multi-position tanks, as illustrated in Fig. 29, the transfer mechanism is returned as shown in Fig. 30, and, at the end of the return stroke, the cycle is complete.

It will be appreciated that a wide variety of wiring arrangements may be utilized for controlling the operation of the apparatus. It will also be appreciated that the apparatus of this invention can readily be used for other treating processes wherein solid work objects are advanced progressively from station to station. The work objects may be immersed in liquids, subjected to spray baths, dried, and otherwise treated in various ways and with wide variation as to sequence of treating processes. For example, the work objects may be subjected to solvent degreasing, acid rinsing, sulfuric acid pickling, neutralizing rinsing, immersion in drawing lubricant, dryoff, and other treatments, in any desired order.

While I have described my invention by reference to one embodiment thereof, it will be apparent to those skilled in the art that various changes other than those referred to above may be made in the form of the device, that equivalent elements may be substituted for those illustrated in the drawings, and that certain features of the invention may be used to advantage independently of the use of other features, all within the spirit of the invention as defined in the annexed claims.

I claim:

1. Apparatus for simultaneously subjecting a plurality of work objects to successive treating steps at spaced-apart treating stations comprising means forming a structurally continuous track extending above said stations, means for raising said entire track away from said treating stations, carrier means for the work objects connected to move along said track, transfer means connected to said carrier means for moving the objects along said track from a location above one station to a location above another station, and means for lowering said entire track and carrier means to introduce a plurality of said work objects into said treating stations simultaneously.

2. Apparatus for simultaneously subjecting a plurality of work objects to successive treating steps at spaced-apart treating stations comprising means forming a structurally continuous track extending above said stations, elevator means for raising and lowering said entire track between upper and lower positions toward and away from said stations, carrier means for the work objects connected to move along said track, transfer means connected to said carrier means to move said carrier means along said track when said track is in said upper position, and reciprocable advancing means engaging said carrier means and operable when said track is in said lower position for moving said carrier means independently of said transfer means.

3. The apparatus defined in claim 2 wherein said stations include a plurality of tanks at least one being longer than another, and wherein said advancing means is connected to move the corresponding work object carrier lengthwise of said longer tank, independently of said transfer means.

4. The apparatus defined in claim 2 wherein said elevator means includes a supporting means for said carrier which is self-detachable from said carrier when said elevator means is moved downwardly relative to said carrier, and wherein means are provided for stopping downward movement of said carrier when said work objects reach a treating station and for continuing the downward movement of said elevator, thereby detaching said supporting means.

5. The apparatus defined in claim 2, wherein said advancing means includes a cylinder and reciprocable piston detachably connected to said carrier means.

6. The apparatus defined in claim 5 wherein said advancing means also includes a pivoted, unidirectional pusher which is free to pivot in one direction but restrained from pivotal movement in the opposite direction.

7. In an apparatus for subjecting a metal work object to successive treatments at spaced-apart treating stations including a tank containing a liquid bath which acts on the metal forming a gaseous product in the bath, the combination comprising a container for the object, means for raising and lowering said container and object, transferring means for carrying said container and object from station to station, and a substantially rigid plate affixed to the top of said tank and sloping away from the side of said tank in the downward direction for tilting said container and said object when said container is lowered into said tank containing said liquid bath.

8. The apparatus defined in claim 7 wherein means are also provided for tilting said object for drainage when said object is lifted out of said bath.

9. The apparatus defined in claim 7 wherein means are provided for hanging said container from said transferring means, wherein said container includes a support for the work object, which support is inclined at an angle to the vertical and to the horizontal when said container is hanging free from said transferring means.

10. Apparatus for treating a work object in a liquid comprising a tank containing the liquid, a container for the object, elevator means for raising and lowering said container into and out of the liquid, attaching means for suspending said container from said elevator means, inclined work object supporting means in said container, and a substantially rigid plate affixed to the top of said tank and sloping away from the side of said tank in the downward direction for inclining said container relative to said tank when said container is in said liquid.

11. The apparatus defined in claim 10, wherein the tilting plate is disposed to incline the container at a greater angle than the inclination of said work object supporting means, whereby the work object is tilted downwardly when the container is lifted out of the liquid and tilted upwardly when the container is immersed in the liquid.

12. In a machine for treating metal objects in an elongated tank containing liquid, the combination comprising a carrier for the objects, means for moving said carrier to a position directly above one end of said tank, means for lowering said carrier into said tank, supporting means integrally associated with said tank for supporting said carrier, means for moving said carrier along said tank while said objects are submerged in the coating liquid, and means integrally associated with said tank for revolving said carrier while said carrier is so moved.

13. The machine defined in claim 12, wherein the means for moving said carrier includes a reciprocable pusher and a unidirectionally operable pivoted member which operates to move said carrier along said tank.

14. The machine defined in claim 12, wherein the supporting means for the carrier comprises a slide track adjacent the top of said tank, and corresponding slide means on said carrier riding on said track.

15. The machine defined in claim 12, wherein said carrier is rotatably mounted on a support, wherein a fixed rack is provided adjacent said support, and wherein a gear is meshed with said rack and connected to rotate said carrier.

16. The machine defined in claim 15, wherein said rack includes a plurality of equally spaced pins meshing with said gear.

17. In a machine for treating objects in a liquid contained in an elongated tank, the combination comprising a carrier for the objects, elevator means for lowering and raising the objects into and out of the tanks, supporting means fixed relative to the tank for supporting said carrier independently of said elevator means, a rack also fixed relative to said tank, a gear connected to said carrier for meshing with said rack, guide means extending adjacent said carrier and tank for guiding said gear to said rack as said carrier is lowered into said tank, and means for moving said carrier lengthwise of said tank whereby said carrier is rotated by said gear and rack.

18. In a machine for subjecting work objects to successive treating steps in a plurality of tanks arranged in an endless elongated path having semicircular ends, the combination comprising a structurally continuous track having semicircular ends arranged above and inside of said path, a plurality of spaced rollers riding on said track, work carrier arms extending outwardly from said rollers directly over said tanks, carriers for the work objects suspended from said arms, means for lowering and raising said entire track toward and away from said tanks, means for reciprocating said work carrier arms to move said carriers from tank to tank, a pair of interconnected, perpendicular arms located at each of said semicircular ends of the track, and link bars pivoted to said reciprocating means and to one of said arms for swinging said arms in response to said reciprocation.

19. The machine defined in claim 18, wherein said arms are anchored to a vertical pivot post located at the center of said semicircular end.

References Cited in the file of this patent

UNITED STATES PATENTS

| | | |
|---|---|---|
| 1,404,309 | McDonald | Jan. 24, 1922 |
| 1,960,339 | Howard | May 29, 1934 |
| 2,048,937 | Larson | July 28, 1936 |
| 2,341,197 | Weiskopf | Feb. 8, 1944 |
| 2,708,417 | Nieter | May 17, 1955 |

FOREIGN PATENTS

| | | |
|---|---|---|
| 544,861 | Germany | Feb. 23, 1932 |